United States Patent
Nickel et al.

(10) Patent No.: US 6,247,871 B1
(45) Date of Patent: Jun. 19, 2001

(54) CLIP FOR JOINING WIRE-MESH STRUCTURES

(75) Inventors: Wilfried Nickel, Menden; Rainer Wesch, Fröndenberg, both of (DE)

(73) Assignee: Obo Bettermann GmbH & Co. KG, Menden (DE)

(*) Notice: Subject to any disclaimer, the term of this patent is extended or adjusted under 35 U.S.C. 154(b) by 0 days.

(21) Appl. No.: 09/159,486

(22) Filed: Sep. 23, 1998

(30) Foreign Application Priority Data

Sep. 24, 1997 (DE) .............................. 197 42 095
Apr. 3, 1998 (DE) .............................. 198 15 047

(51) Int. Cl.$^7$ .................. B25G 3/36; A47F 3/14
(52) U.S. Cl. .................. 403/396; 403/384; 403/399; 403/389; 403/397; 211/133.5; 211/126.3; 248/249; 248/302
(58) Field of Search .................. 403/399, 384, 403/396, 389, 391, 397, 398; 248/249, 302; 211/133.5, 126.3

(56) References Cited

U.S. PATENT DOCUMENTS

| 2,523,785 | * | 9/1950 | Sereno ........................... 403/188 |
| 3,486,531 | * | 12/1969 | Nalodka . |
| 3,604,065 | * | 9/1971 | Slominski ........................ 24/23 R |
| 4,765,495 | * | 8/1988 | Bisk ................................. 211/113 |
| 5,331,725 | * | 7/1994 | Chou ............................ 403/391 X |
| 5,384,937 | * | 1/1995 | Simon ........................... 403/282 X |
| 5,749,479 | * | 5/1998 | Belokin et al. .................. 211/113 |
| 5,784,762 | * | 7/1998 | Huntting ........................... 24/129 |

FOREIGN PATENT DOCUMENTS

| 252030 | * | 11/1960 | (AU) . |
| 2813379 | * | 10/1978 | (DE) ................................. 403/391 |

* cited by examiner

*Primary Examiner*—Anthony Knight
*Assistant Examiner*—Ernesto Garcia
(74) *Attorney, Agent, or Firm*—Herbert Dubno; Andrew Wilford

(57) ABSTRACT

A pair of wire channels each have a cross U-shaped end wire of predetermined diameter joined to ends of longitudinal wires. A U-shaped clip engages around the end wires between a respective pair of the longitudinal wires. It has a floor engaging the two end wires and is formed with a pair of flanks each engaging a respective one of the ends wires and each formed with a respective formation retaining the respective end wire against the floor.

10 Claims, 9 Drawing Sheets

CLIP FOR JOINING WIRE-MESH STRUCTURES

FIELD OF THE INVENTION

The present invention relates to structures made out of wire-mesh elements. More particularly this invention concerns a clip for joining such elements together.

BACKGROUND OF THE INVENTION

Wire-mesh channels are typically used to hold wires and cables in such a manner that they are solidly supported yet readily accessible. Thus it is standard to provide such channels adjacent the ceiling in computer rooms and the like.

The typical channel is made of a plurality of relatively stiff longitudinal wires and at least two crosswise U-shaped wires to which they are welded, for instance with four longitudinal wires at the base of the U-shaped cross wire and two more longitudinal wires on each of the upwardly pointing arms of the cross wires. Of course angled channels are provided for going around corners and changing levels and T- or X-shaped channels are provided for forming intersections where several such channels are joined together.

All these wire-mesh structures typically end at a standardized U-shaped end defined by a single cross wire and the ends of the longitudinal wires. This makes it possible to join the various structures together into any shape, achieving a relatively good custom fit.

To this end the structures to be joined are typically aligned endwise and secured together with clips. As described in German patent document 295 04 839 such a clip is made of sheet metal and has a pair of sides that are fitted to opposite sides of the aligned structure ends and then secured together with a screw and nut. The clip therefore has several parts and space must be allowed for the screw connection. In addition the job of mounting such a clip in place requires that several pieces be fitted together on the structure and then a tool employed to tighten the screw.

OBJECTS OF THE INVENTION

It is therefore an object of the present invention to provide an improved clip for securing together wire-mesh channel structures.

Another object is the provision of such an improved clip for securing together wire-mesh channel structures which overcomes the above-given disadvantages, that is which is easy to use and inexpensive to manufacture, and that solidly couples together the two structures.

SUMMARY OF THE INVENTION

The instant invention is a clip used with a pair of wire channels each having a cross U-shaped end wire of predetermined diameter joined to ends of longitudinal wires. The clip according to the invention is U-shaped and engaged around the end wires between a respective pair of the longitudinal wires. It has a floor engaging the two end wires and is formed with a pair of flanks each engaging a respective one of the ends wires and each formed with a respective formation retaining the respective end wire against the floor.

Thus this clip is a single piece that can be snapped around the end wires of two channels to solidly lock them together. There is no need to keep track of and manipulate a screw fastener, yet the connection is just as solid as any of the prior-art systems.

According to the invention the clip is made of sheet steel at most 2 mm thick. The formations are bumps pressed into the sheet metal and having a height generally equal to the thickness of the sheet metal of the clip.

In one embodiment in accordance with the invention the flanks of the clip are spaced apart by a distance substantially equal to twice the wire diameter so that the end wires are pressed closely together between the flanks. In another system according to the invention the flanks of the clip are spaced apart by a distance equal to substantially more than twice the wire diameter and the clip is formed with a flap extending crosswise of the floor and engaged between the wires engaging the floor so that each wire is engaged between the flap and the respective flank. In the latter system the clip is formed at each end of the floor with one such flap and the clip is formed at a base of each such flap with a weakening slot facilitating bending of the flap between the wires. Thus after the end wires are fitted, spaced apart, to the clip, a screwdriver is inserted in to the slot to bend over the flap and lock them in place, the permanent plastic deformation of the flap ensuring a permanent coupling of the two channels.

In accordance with another feature of the invention the clip is formed at an outer end of each flank with a generally planar tab extending generally parallel to the floor and having a length equal to about three times the spacing between the flanks. The tabs are generally coplanar and directed longitudinally away from each other. Each tab normally has a transverse width equal to slightly less than a transverse spacing between the respective pair of longitudinal side wires. Thus the tabs make it particularly easy to mount the clip in place, simply by fitting it at an angle over two juxtaposed end wires and then twisting it into position parallel to the longitudinal wires.

In addition each tab can be formed with a pair of longitudinal edges each formed with a respective outwardly projecting lug bearing against a respective one of the pair of longitudinal wires. Each such lug extends at an acute angle to the respective tab and is generally rectangular and located at an outer end of the respective tab or generally triangular and extends a full length of the respective edge of the respective tab. Alternately each tab has a wide outer end bearing against the respective pair of longitudinal wires. In this case the clip is so deep that these tabs can lie flatly against the pair of longitudinal wires.

The floor and flanks normally according to the invention have a common length equal to slightly less than a spacing between the respective pair of longitudinal wires. In addition each flank is formed at each end with one such formation constituted as an inwardly directed bump. Furthermore the clip is open outward of the channels and the flanks extend outward of the channels from the floor.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

As seen in FIGS. 1 through 6 a pair of identical wire channels 1 are each formed by a plurality of longitudinally extending wires or rods 2 and a plurality of U-shaped transverse wires or rods 3, all welded together at their intersections. There are two wires 2 along each side formed by the upright arms of the transverse wires 3 and four along the flat floor or base thereof.

These channels 1 are held together according to the invention at their ends by sheet metal clips 4 of U-shape and 2 mm thick, each having a base 5 of a longitudinal width w equal to at least twice the diameters of the wires 2 and 3 and flanks 8 formed with inward bumps or projections 6 so as to form a throat slightly narrower than this double-diameter dimension. Extending from the outer edge of each such flank 8 is a planar tab 7, the two tabs 7 being coplanar. The clip 4 has an overall height h equal to slightly less than the spacing between two of the side wires 2.

Figure 1:
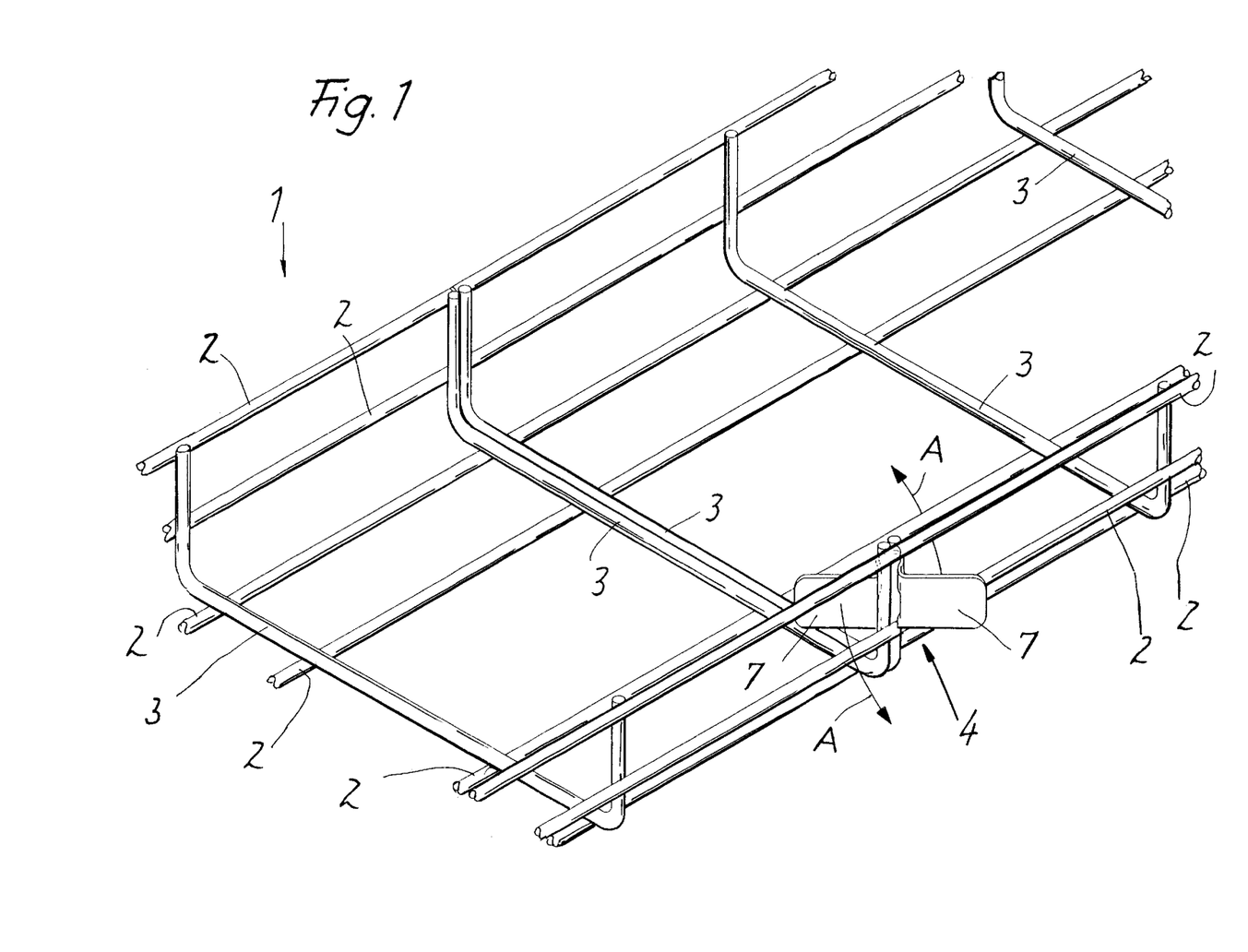
FIGS. 1 and 2 are perspective views showing two wire-mesh channels during and after interconnection by a clip according to the invention.
Figure 2:
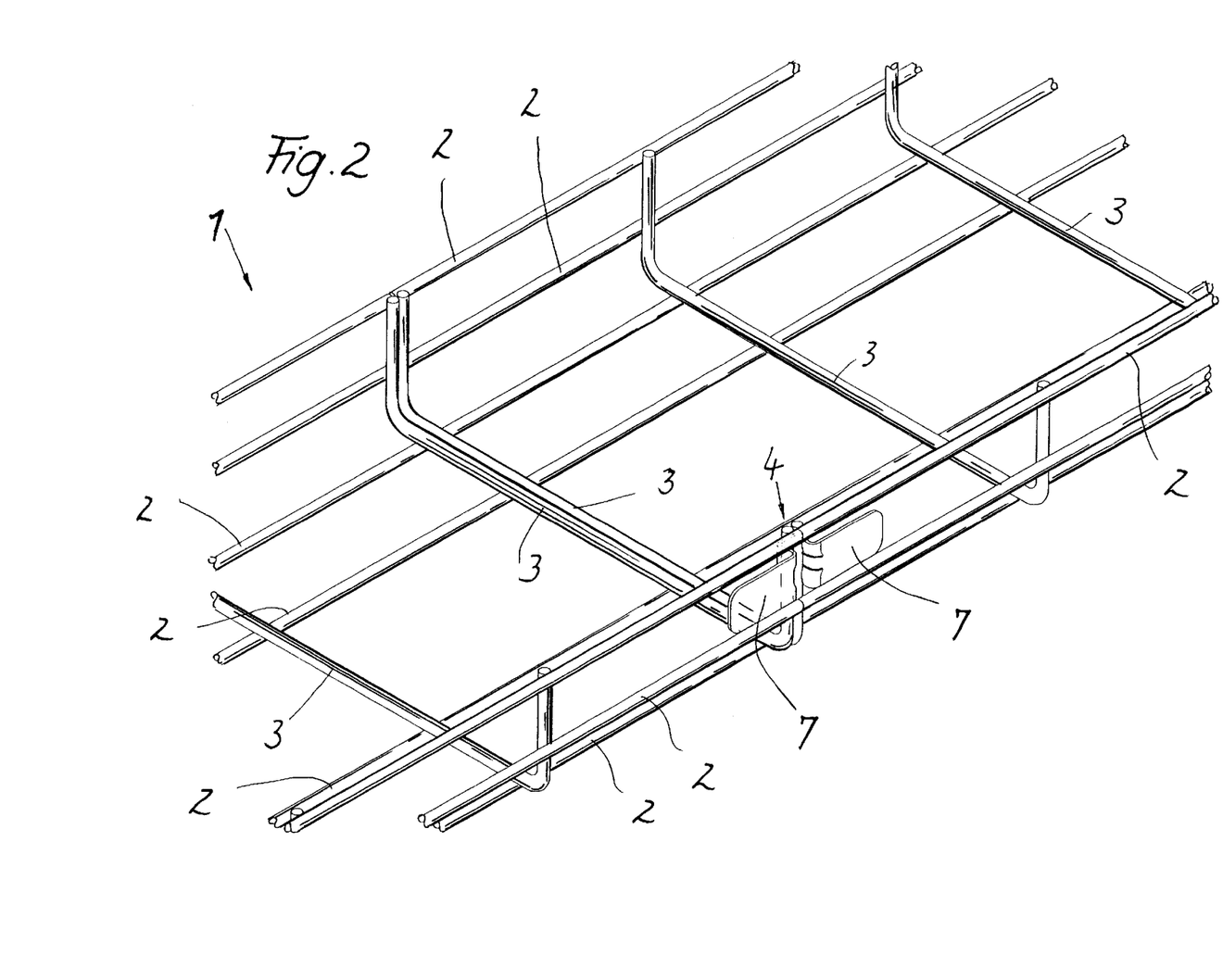
Figure 3:
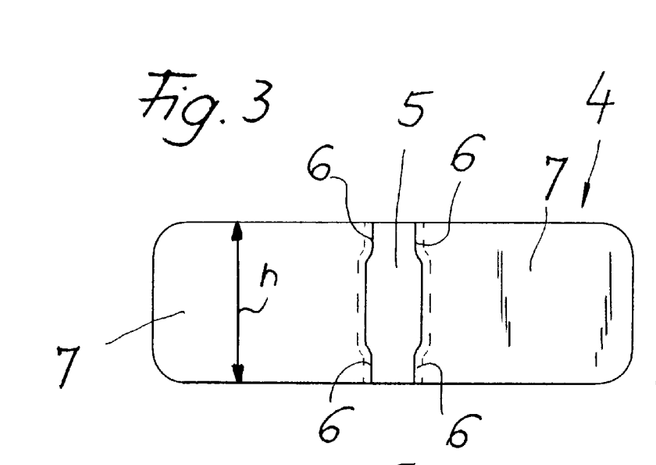
FIG. 3 is a back view of the clip according to the invention.
Figure 4:
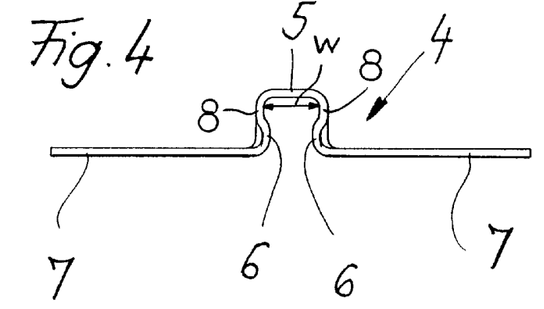
FIGS. 4, 5, and 6 are top, end, and perspective views of the clip of FIG. 3.
Figure 5:
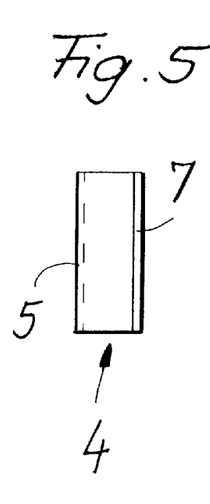
Figure 6:
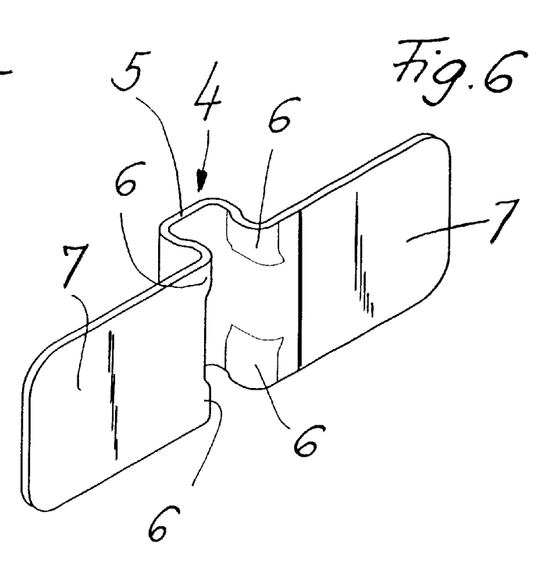

Such a clip is used by longitudinally abutting two channels 1 as shown in FIG. 1 so that the end cross wires 3 lie directly against each other. Then a clip 4 is fitted between two of the side wires 2 over the upright arms of the two end wires 3, but with the plane of the tab 7 lying at about 45° to the plane of the respective side wires 2. Then as illustrated by arrows A the clip 4 is twisted to a position with the tabs 7 running longitudinally, that is parallel to the wires 2, so as to snap the two end wires 3 into tight engagement with each other, lying against the floor 5 of the clip 4 and captured between the formations 6 and this floor 5. In this position the clip 4 holds the end wires 3 elastically together. Another such clip 4 can be applied to the opposite side of the structure, and even over the wires 3 between the floor wires 2.

Figure 7:
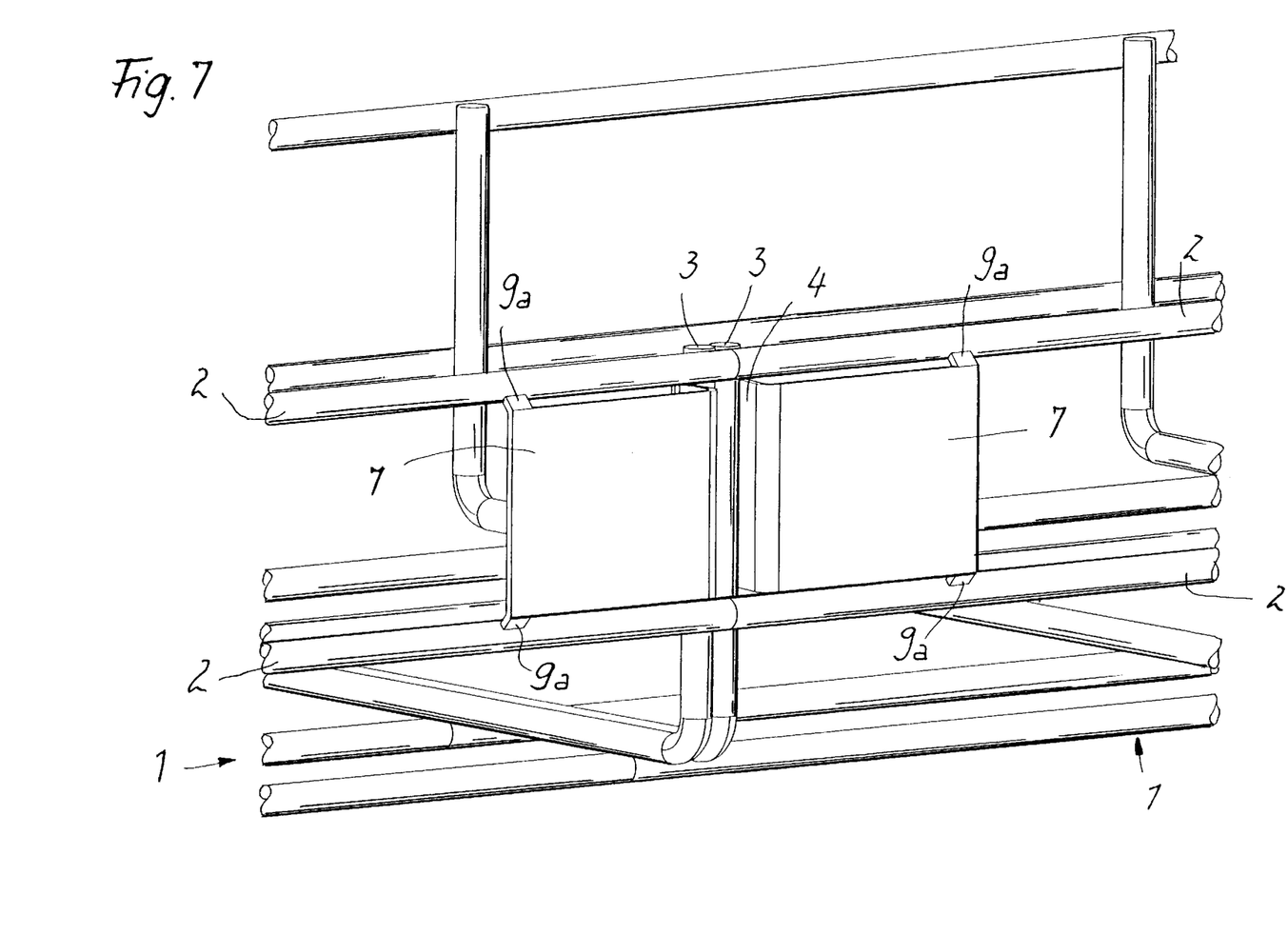
FIGS. 7 and 8 are perspective side and end sectional views of a second clip in accordance with the invention.
Figures 8, 10:
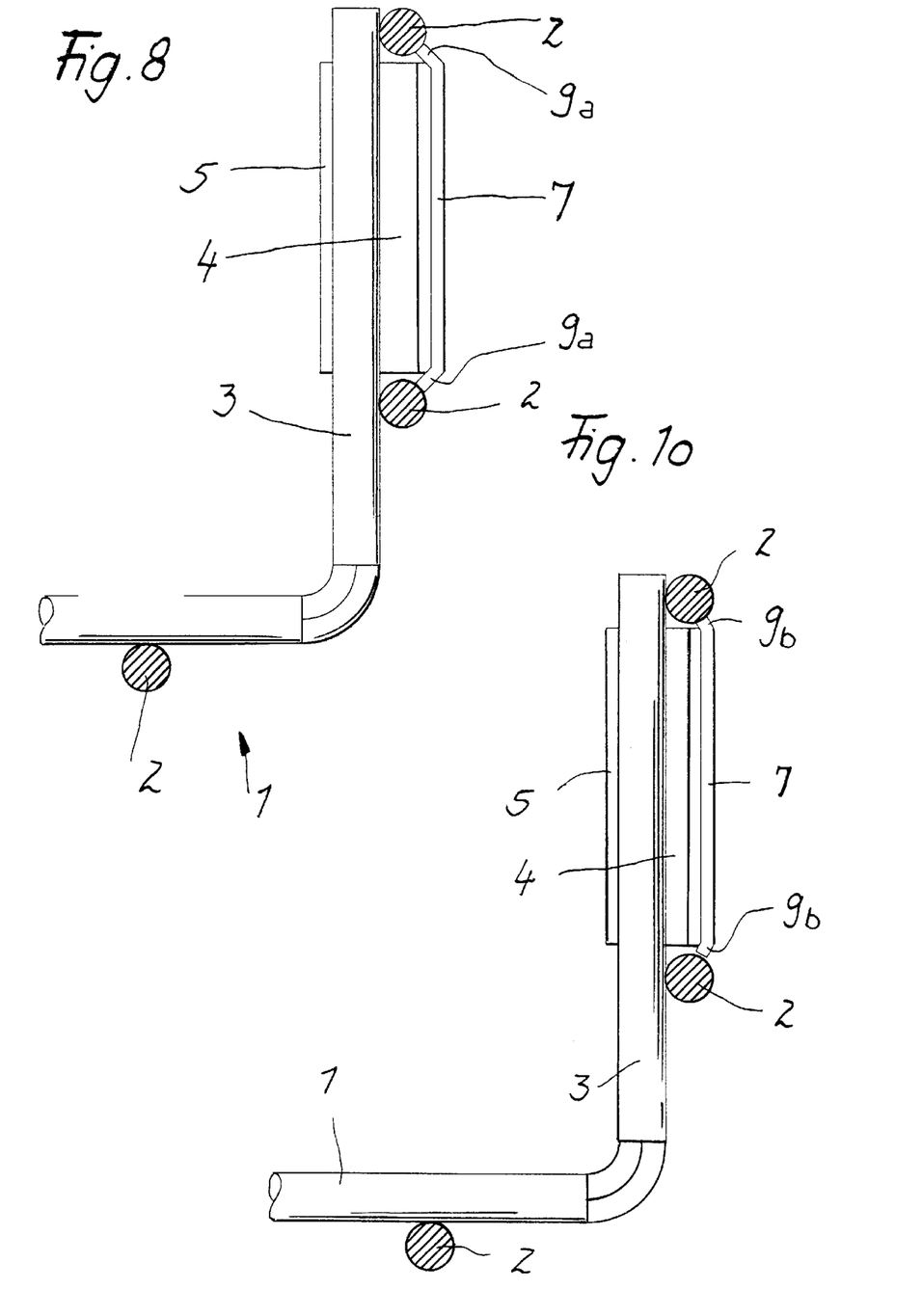
FIGS. 9 and 10 are views like FIGS. 7 and 8 of a third clip.

The arrangement of FIGS. 7 and 8 is substantially identical to that of FIGS. 1 through 6, except that here the ends of the tabs 7 are formed with angled lugs 9a that extend at about 45° to the tabs 7 and bear against outer faces of the side wires 2. These lugs 9a are deflected elastically inwardly on one side and/or the wires 2 are deflected elastically apart as the clip 4 is pivoted into place. Once in the illustrated position, the lugs 9a hold the clip 4 solidly in place.

Figure 9:
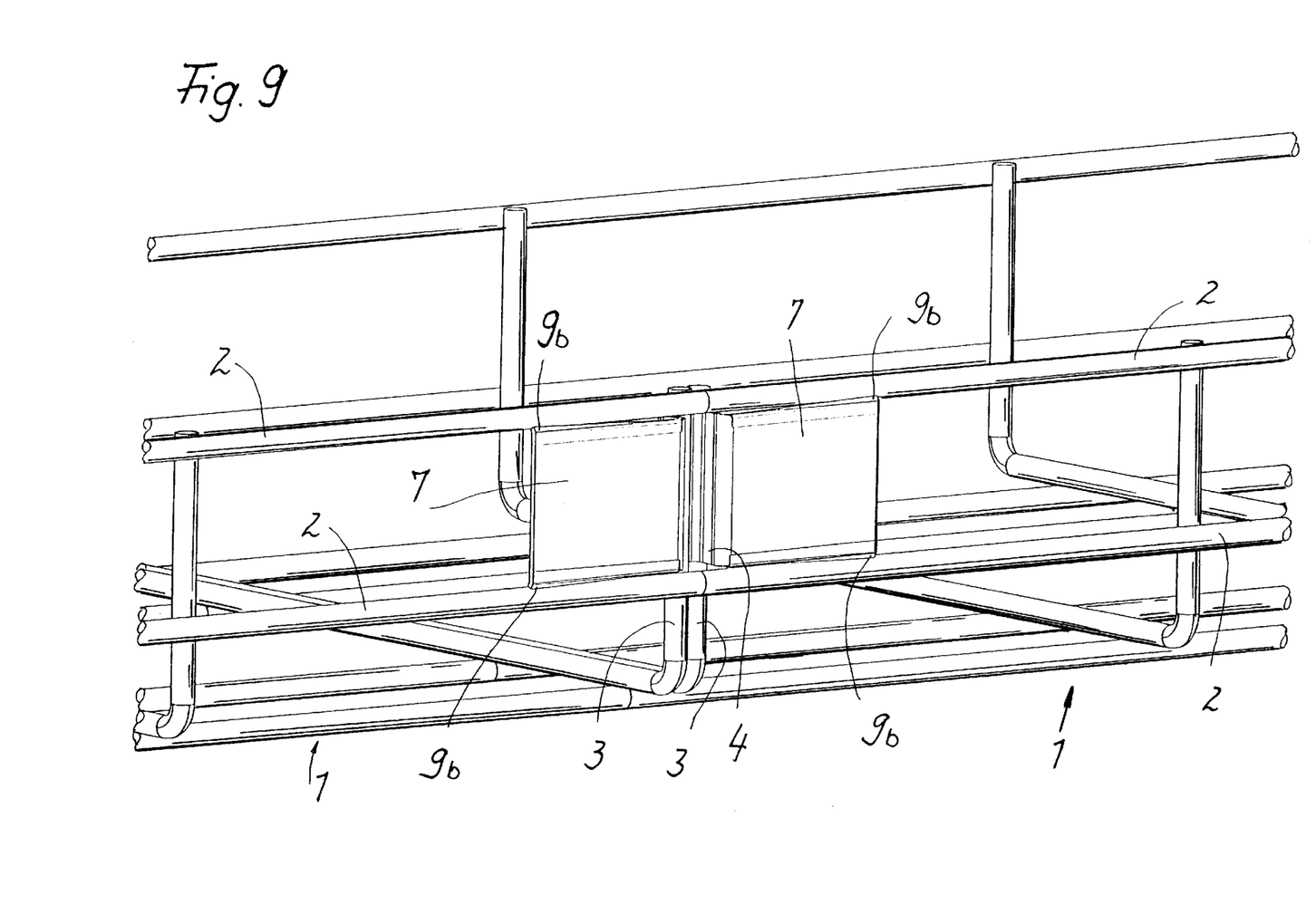

The system of FIGS. 9 and 10 has tabs 7 whose outer edges are formed with elongated triangular retaining lugs 9b that function similarly to the lugs 9a of FIGS. 7 and 8. These lugs 9b bear at their outer ends obliquely against the side wires 2.

Figure 11:
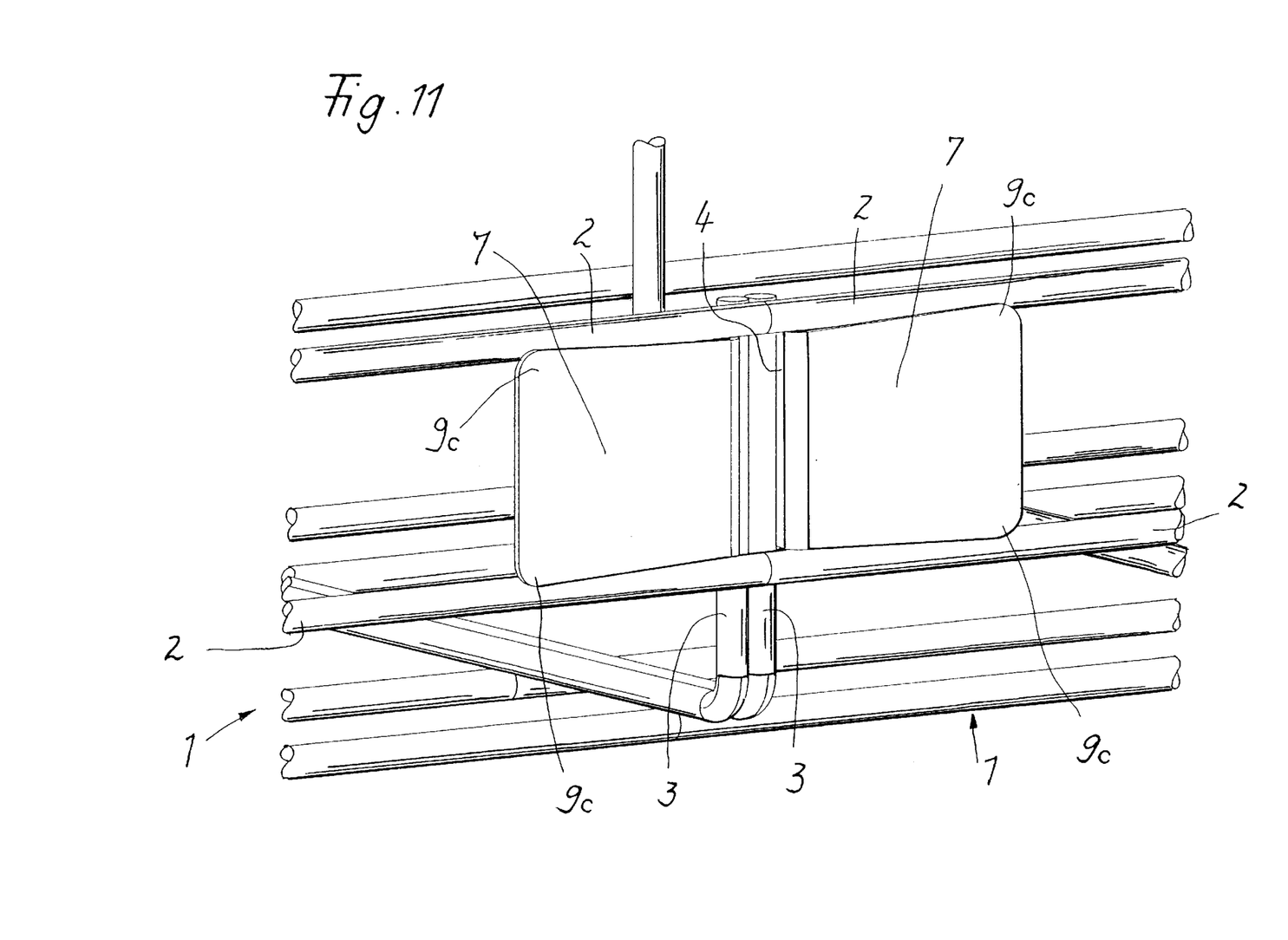
FIGS. 11 and 12 are views like FIGS. 7 and 8 of a fourth clip.
Figure 12:
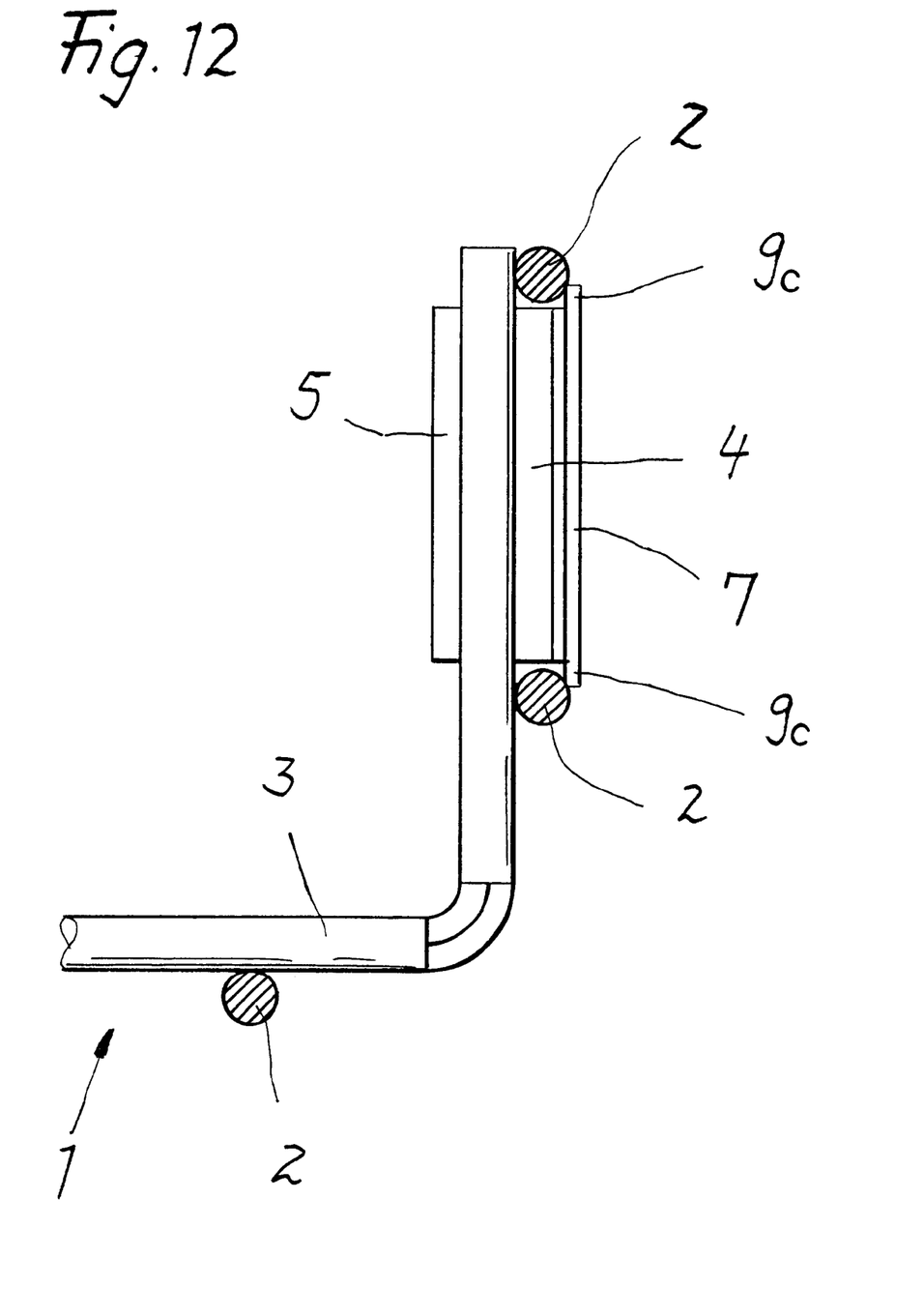

In FIGS. 11 and 12 the tabs 7 are simply wider at their outer ends, having edges 9c that are at the outer tab ends wider than the spacing between the wires 2. Thus these outer ends lie outside the wires 2 and hold the clip 4 solidly in place.

Figure 13:
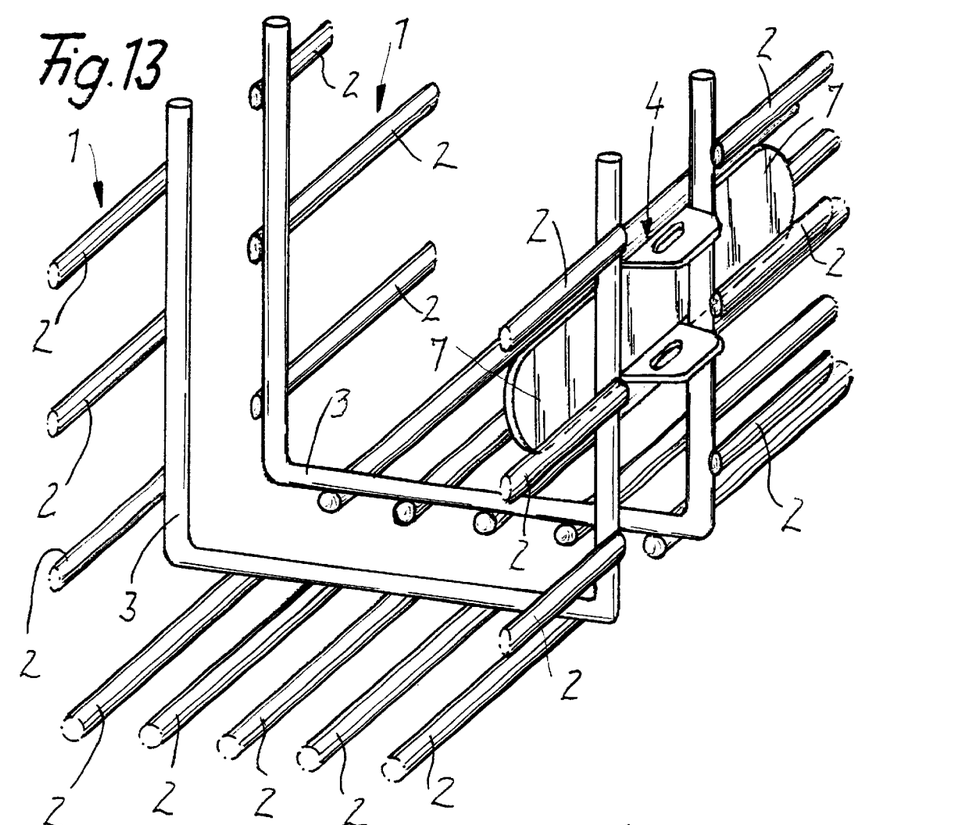
FIG. 13 is a perspective view of a mesh structure constructed using a fifth clip in accordance with the invention.
Figures 14, 15:
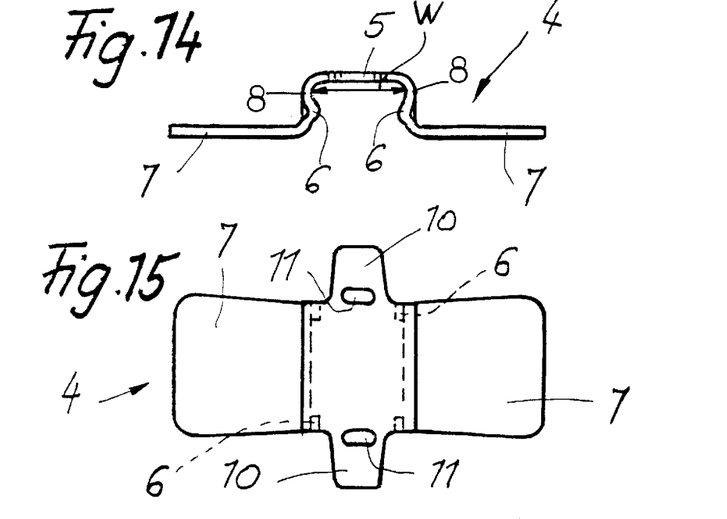
FIGS. 14 and 15 are top and back views of the fifth clip prior to installation.

The system of FIGS. 13 through 15 uses a clip 4 where the width W of the floor 5 is substantially more than twice the diameter of the wires 2. Each end of the clip 4 is formed with an outwardly projecting flap or tab 10 across whose base partially extends a longitudinal weakening slot 11. Thus with this system the end wires 3 held in the clip 4 do not touch each other. Instead they remain spaced apart and are retained in place by the tabs 10, which are bent outward to the wires 3 solidly in place against the floor 5 under the retaining projections 6. A screwdriver can be inserted into the slot 11 to bend the flap 10 easily.

We claim:

1. In combination
a pair of wire channels each having a cross U-shaped end wire of predetermined diameter joined to ends of longitudinal wires, the channels being aligned longitudinally with one of the end wires of one of the channels closely juxtaposed with one of the end wires of the other channel; and
a U-shaped clip engaged around the one end wires between a respective pair of the longitudinal wires and formed with
a floor engaging the one end wires,
a pair of flanks extending transversely from ends of the floor, each flank engaging a respective one of the one end wires,
a bump pressed into the sheet metal on each of the flanks retaining the respective one end wire against the floor, the bumps having a height equal generally to a thickness of the sheet-metal clip, and
a generally planar tab extending generally parallel to the floor from an outer end of each of the flanks, the flanks being generally coplanar and directed longitudinally away from each other, each tab having a pair of longitudinal edges bearing transversely against the respective pair of longitudinal wires.

2. The combination defined in claim 1 wherein the sheet metal has a thickness of at most 2 mm.

3. The combination defined in claim 1 wherein the flanks of the clip are spaced apart by a distance substantially equal to twice the predetermined diameter, whereby the end wires are pressed closely together between the flanks.

4. In combination
a pair of wire channels each having a cross U-shaped end wire of Predetermined diameter joined to ends of longitudinal wires, the channels being aligned longitudinally with one of the end wires of one of the channels closely juxtaposed with one of the end wires of the other channel; and
a U-shaped sheet-metal clip engaged around the one end wires between a respective pair of the longitudinal wires and formed with
a floor engaging the one end wires,
a pair of flanks extending transversely from ends of the floor, each flank engaging a respective one of the one end wires, the flanks of the clip being spaced apart by a distance equal to substantially more than twice the predetermined diameter,
a flap extending crosswise of the floor and engaged between the one wires engaging the floor, whereby each of the one wires is engaged between the flap and the respective flank,
a formation on each of the flanks retaining the respective one end wire against the floor, and
a generally planar tab extending generally parallel to the floor from an outer end of each of the flanks, the flanks being generally coplanar and directed longitudinally away from each other, each tab having a air of longitudinal edges bearing transversely against the respective pair of longitudinal wires.

5. In combination a pair of wire channels each having a cross U-shaped end wire of predetermined diameter joined to ends of longitudinal wires, the channels being aligned longitudinally with one of the end wires of one of the channels closely juxtaposed with one of the end wires of the other channel; and a U-shaped clip engaged around the end wires between a respective pair of the longitudinal wires, having a floor engaging the two end wires, and formed with a pair of flanks each engaging a respective one of the ends wires and formed with a respective formation retaining the respective end wire against the floor, the flanks of the clip being spaced apart by a distance equal to substantially more than twice the predetermined diameter, the clip further being formed with a flap extending crosswise of the floor and engaged between the end wires engaging the floor, whereby each wire is engaged between the flap and the respective flank.

6. The combination defined in claim 5 wherein the clip is formed at each end of the floor with one such flap.

7. The combination defined in claim 1 wherein the floor and flanks have a dimension equal to slightly less than a spacing between the respective pair of longitudinal wires.

8. The combination defined in claim 1 wherein each flank is formed at each end with one such formation constituted as an inwardly directed bump.

9. The combination defined in claim 1 wherein the clip is open outward of the channels, and the flanks extend outward of the channels from the floor.

10. The combination defined in claim 5 wherein the clip is formed at a base of each flap with a weakening slot facilitating bending of the flap-between the wires.

* * * * *